(12) United States Patent
Kume et al.

(10) Patent No.: US 11,563,358 B2
(45) Date of Patent: Jan. 24, 2023

(54) ROTARY ACTUATOR HAVING RESIN MOLDED BODY AND CONNECTION TERMINALS

(71) Applicant: DENSO CORPORATION, Kariya (JP)

(72) Inventors: Mikine Kume, Kariya (JP); Hiroyuki Kado, Kariya (JP)

(73) Assignee: DENSO CORPORATION, Kariya (JP)

( * ) Notice: Subject to any disclaimer, the term of this patent is extended or adjusted under 35 U.S.C. 154(b) by 318 days.

(21) Appl. No.: 16/847,788

(22) Filed: Apr. 14, 2020

(65) Prior Publication Data

US 2020/0336039 A1 Oct. 22, 2020

(30) Foreign Application Priority Data

Apr. 16, 2019 (JP) .............................. JP2019-077981

(51) Int. Cl.
*H02K 5/22* (2006.01)
*H02K 11/33* (2016.01)
*F16H 63/34* (2006.01)

(52) U.S. Cl.
CPC ............ *H02K 5/225* (2013.01); *H02K 11/33* (2016.01); *F16H 63/3466* (2013.01); *H02K 2203/03* (2013.01)

(58) Field of Classification Search
CPC ............ H02K 5/08; H02K 5/22; H02K 5/225; H02K 11/30; H02K 11/33; F16H 63/3466
See application file for complete search history.

(56) References Cited

U.S. PATENT DOCUMENTS

| 2009/0140599 | A1 | 6/2009 | Yoshiyama et al. | |
| 2016/0156246 | A1* | 6/2016 | Hotori | H02K 5/225 310/43 |
| 2018/0006525 | A1* | 1/2018 | Matsuyama | H05K 1/0228 |
| 2019/0036415 | A1* | 1/2019 | Kataoka | H01R 13/50 |
| 2019/0229588 | A1 | 7/2019 | Takahashi et al. | |
| 2020/0088182 | A1* | 3/2020 | Honda | F04C 29/068 |

(Continued)

FOREIGN PATENT DOCUMENTS

| JP | 2007-165003 | 6/2007 |
| JP | 2009-162268 | 7/2009 |

OTHER PUBLICATIONS

U.S. Appl. No. 16/847,953, to Kume, et al., entitled: "Rotary Actuator", filed Apr. 14, 2020 (18 pages).

(Continued)

*Primary Examiner* — Eric Johnson
(74) *Attorney, Agent, or Firm* — Nixon & Vanderhye P.C.

(57) ABSTRACT

A rotary actuator for use in a shift-by-wire system of a vehicle includes a motor, a controller for controlling the motor, and a case housing the motor and the controller. An upper case of the case includes a resin molded body, which integrally has a housing that houses the motor and a connector that is used for external connection, and a plurality of external connection terminals, which are embedded in the resin molded body and are capable of connecting the controller to an outside member. Each of the external connection terminals includes a base protruding into an installation space for a control board in a board extending direction, a bend bent from the base toward the control board, and a tip portion extending from the bend to the control board.

7 Claims, 7 Drawing Sheets

(56) References Cited

U.S. PATENT DOCUMENTS

2020/0200234 A1    6/2020    Kinjo et al.

OTHER PUBLICATIONS

U.S. Appl. No. 16/847,974, to Kannou, et al., entitled: "Rotary Actuator", filed Apr. 14, 2020 (22 pages).
U.S. Appl. No. 16/847,989, to Kume, et al., entitled: "Rotary Actuator", filed Apr. 14, 2020 (20 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

\* cited by examiner

ROTARY ACTUATOR HAVING RESIN MOLDED BODY AND CONNECTION TERMINALS

CROSS REFERENCE TO RELATED APPLICATIONS

This application is based on Japanese Patent Application No. 2019-077981 filed on Apr. 16, 2019, all of which is incorporated herein by reference.

TECHNICAL FIELD

The present disclosure relates to a rotary actuator.

BACKGROUND

Conventionally, there has been known an electromechanical integrated rotary actuator in which an operation unit with a motor and a controller for controlling the motor are integrally formed. For example, a board of a controller is housed in a first case (hereinafter, an upper case) that houses the motor. A connector used for external connection, which is a separate component from the upper case, is fit into the upper case.

SUMMARY

One aspect of the present disclosure is a rotary actuator for a shift-by-wire system of a vehicle. The rotatory actuator includes a motor, a controller, and a case. The controller is configured to control the motor. The case houses the motor and the controller.

The case includes a resin molded body and a plurality of external connection terminals. The resin molded body integrally has a housing portion that houses the motor and a connector used for external connection with an external member. The plurality of external connection terminals are embedded in the resin molded body to connect the controller to the external member.

A direction that is parallel to a board of the controller is defined as a board extending direction. Each of the plurality of external connection terminals includes a base protruding into a space for installing the board in the board extending direction, a bend bent from the base toward the board, and a tip portion extending from the bend to the board.

DETAILED DESCRIPTION

Hereinafter, a plurality of embodiments of a rotary actuator (hereinafter, actuator) will be described with reference to the drawings. In the embodiments, substantially the same components are denoted by the same reference numerals and description thereof is omitted.

To begin with, relative technologies will be described below only for easily understanding the present disclosure.

In a rotary actuator, since the connector is a separate component from the upper case, there is a concern that the connecting force of the connector is insufficient with respect to the load generated when attaching/detaching the connector and the weight of the wire harness during its vibration. In addition, it is necessary to apply a sealant between the connector and the upper case. However, since the connector needs to be fit into the upper case and be clamped from both upper and lower sides, it may be difficult to apply a sealant and, as a result, sealing between the connector and the upper case cannot be attained.

The present disclosure has been provided in view of the above and a rotary actuator that can secure a sufficient connecting force by a connector as well as sufficient sealing for a case will be described in the following embodiments.

One aspect of the present disclosure is a rotary actuator for a shift-by-wire system of a vehicle. The rotatory actuator includes a motor, a controller, and a case. The controller is configured to control the motor. The case houses the motor and the controller.

The case includes a resin molded body and a plurality of external connection terminals. The resin molded body integrally has a housing portion that houses the motor and a connector used for external connection with an external member. The plurality of external connection terminals are embedded in the resin molded body to connect the controller to the external member.

A direction that is parallel to a board of the controller is defined as a board extending direction. Each of the plurality of external connection terminals includes a base protruding into a space for installing the board in the board extending direction, a bend bent from the base toward the board, and a tip portion extending from the bend to the board.

In this way, by integrally molding the connector and the housing with a resin, it is easier to secure a sufficient connecting force by the connector as compared with a connector that is attached to a case as a separate component. Further, since no gap is formed between the connector and the housing, there is no need to apply a sealing agent. Therefore, the connector strength and sealing for the case can be ensured as the same time. Further, by providing the bend in each of the external connection terminals, stress due to temperature deformation or vibration applied to the connecting portion between the board and the terminal can be reduced, and thus reliability can be improved.

First Embodiment

In this embodiment, an actuator is used as a driver of a shift-by-wire system for a vehicle.

(Shift-by-Wire System)

Figure 1:
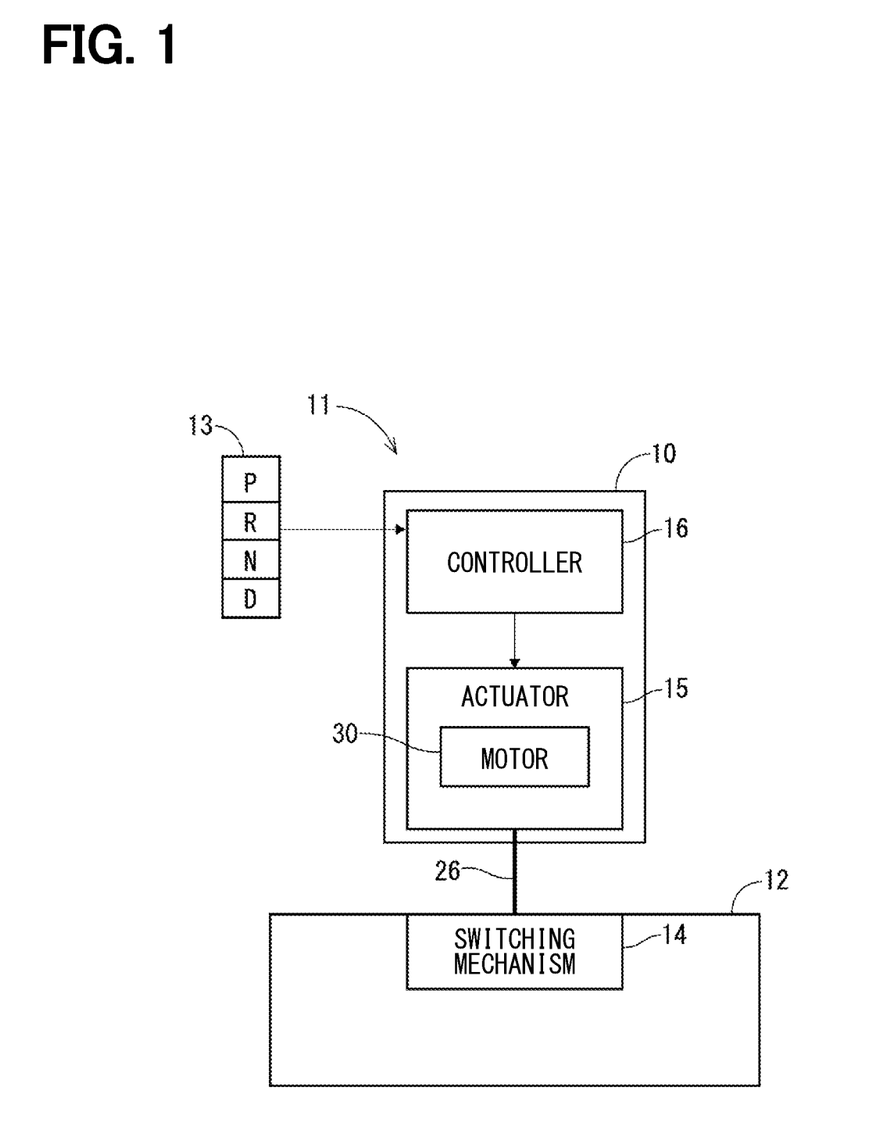
FIG. 1 is a schematic diagram showing a shift-by-wire system to which a rotary actuator according to a first embodiment is applied.

The configuration of the shift-by-wire system will be described with reference to FIGS. 1 and 2. As shown in FIG. 1, the shift-by-wire system 11 includes a shift operation device 13 that outputs an instruction (i.e., a command signal)

to designate a shift range to the transmission 12 and an actuator 10 that operates a shift range switching mechanism 14 of the transmission 12. The actuator 10 includes an operating unit 15 that has a motor 30 and a controller 16 that controls the motor 30 in response to a shift range instruction signal.

Figure 2:
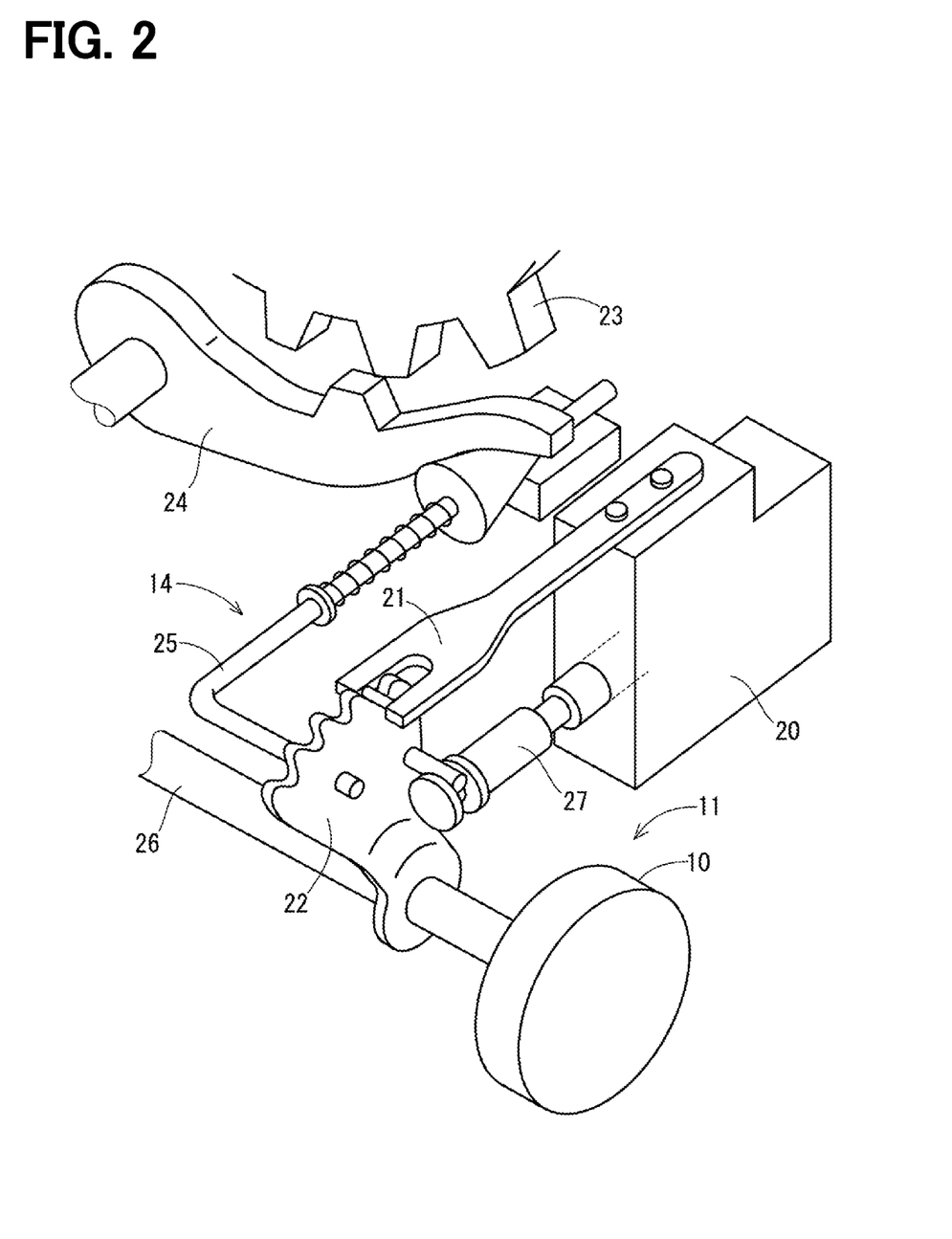
FIG. 2 is a diagram illustrating a shift range switching mechanism of FIG. 1.

As shown in FIG. 2, the shift range switching mechanism 14 includes a range switching valve 20, a detent spring 21 and a detent lever 22, a park pole 24, and a manual shaft 26. The range switching valve 20 controls a supply of hydraulic pressure to a hydraulic operating mechanism in the transmission 12 (see FIG. 1).

The detent spring 21 and a detent lever 22 are configured to keep a shift range. The park rod 25 is configured to prevent an output shaft from rotating by fitting the park pole 24 into a park gear 23 of the output shaft of the transmission 12 when the shift range is switched to a parking range. The manual shaft 26 rotates together with the detent lever 22.

The shift range switching mechanism 14 rotates the detent lever 22 together with the manual shaft 26 to move a valve body 27 and the park rod 25 of the range switching valve 20 connected to the detent lever 22 to a position corresponding to a target shift range. In the shift-by-wire system 11, the actuator 10 is connected to the manual shaft 26 in order to perform the shift range change electrically.

(Actuator)

Figure 3:
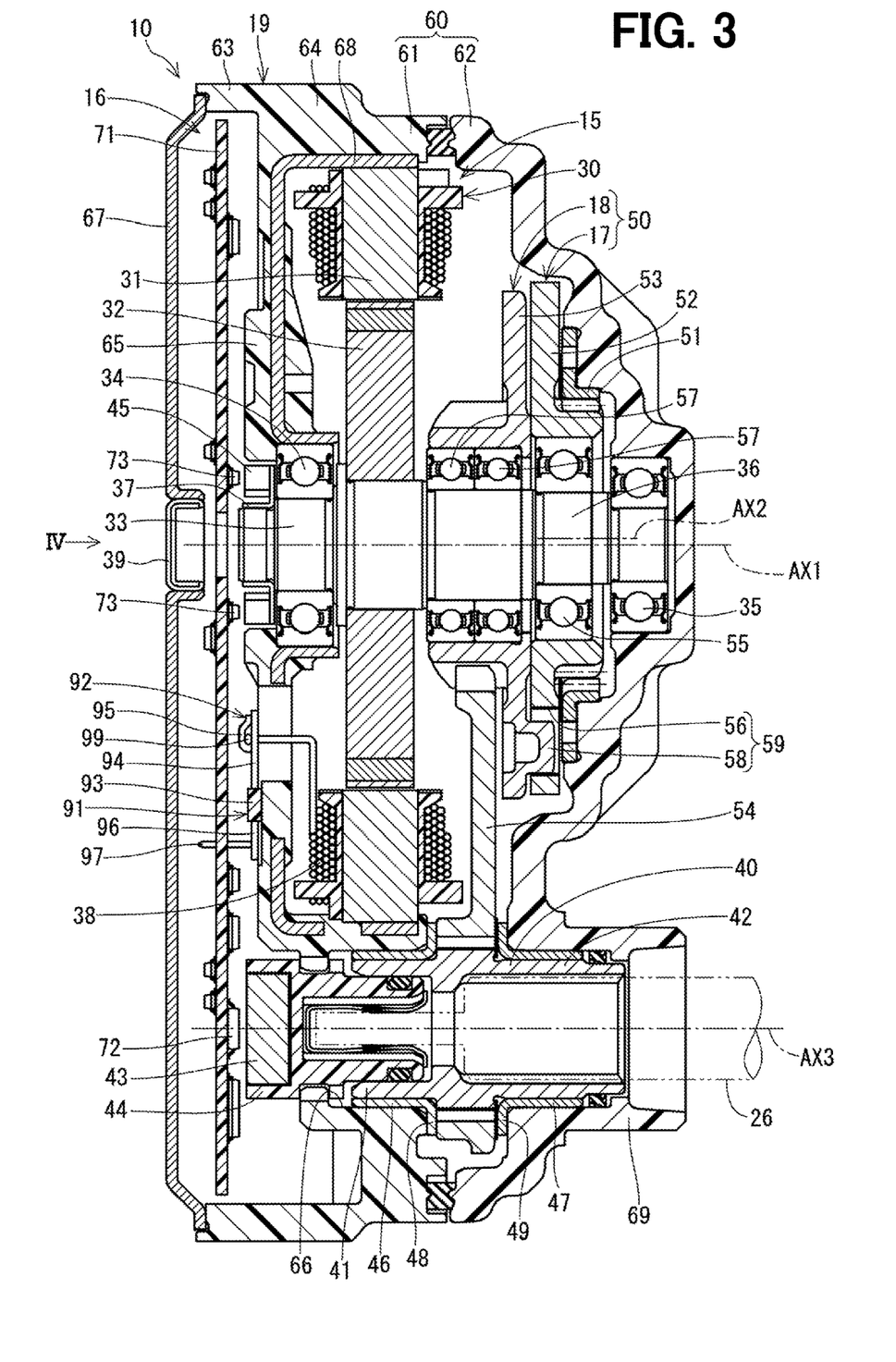
FIG. 3 is a cross-sectional view of the rotary actuator according to the first embodiment.

Next, the configuration of the actuator 10 will be described. As shown in FIG. 3, the actuator 10 is an electromechanical integrated actuator having the operating unit 15 and the controller 16 in a housing 19.

The housing 19 includes a plate cover 67 and a case 60 including a cylindrical upper case 61 and a cup-shaped lower case 62. A partition 65 is formed between one end 63 and the other end 64 of the upper case 61. A control board 71 is provided inside of the one end 63. The control board 71 is covered by a plate cover 67 provided at an opening of the one end 63, thereby ensuring shielding for the control board 71. The lower case portion 62 is attached to the other end portion 64.

Further, the lower case portion 62 includes a cylindrical protruding portion 69 that protrudes toward a side opposite to the upper case 61. The manual shaft 26 is inserted into the cylindrical protrusion 69.

The operation unit 15 includes the motor 30 as a driving power generator, an output shaft 40 arranged in parallel with the motor 30, and a speed-reducing mechanism 50 that reduces a rotational speed of the motor 30 and transmits the rotation to the output shaft 40. The case 60 houses the operation unit 15.

The motor 30 includes a stator 31 press-fitted into, and fixed to, a plate case 68 at the other end 64, a rotor 32 provided inside the stator 31, and a motor shaft 33 that rotates about a rotation axis AX1 together with the rotor 32. The motor shaft 33 is rotatably supported by both a bearing 34 disposed in the plate case 68 and a bearing 35 disposed in the lower case portion 62.

Further, the motor shaft 33 has an eccentric portion 36 eccentric with the rotation axis AX1 at a position on a side of the rotor 32 close to the lower case portion 62. The motor 30 is able to rotate bidirectionally by controlling a current supplied to the coil 38 by the controller 16 and is also able to stop at desired rotational positions. A plug 39 is attached to a through hole of the plate cover 67. If a failure occurs, the motor shaft 33 can be forcibly rotated manually after detaching the plug 39.

The speed-reducing mechanism 50 has a first speed-reducing portion 17 including a ring gear 51 and a sun gear 52 and a second speed-reducing portion 18 including a drive gear 53 and a driven gear 54 as parallel shafts type gears. The ring gear 51 is coaxially disposed with the rotation axis AX1. The sun gear 52 is rotatably supported about the eccentric axis AX2 by a bearing 55 that is fitted into the eccentric portion 36. The sun gear 52 meshes with, and fits snugly inside, the ring gear 51. When the motor shaft 33 rotates, the sun gear 52 performs planetary motion in which the sun gear 52 revolves around the rotation axis AX1 and rotates about the eccentric axis AX2. At this time, the rotational speed of the sun gear 52 is reduced relative to the rotational speed of the motor shaft 33. The sun gear 52 has a hole 56 for rotation transmission.

The drive gear 53 is provided on the rotation axis AX1 and is rotatably supported about the rotation axis AX1 by a bearing 57 fitted into the motor shaft 33. Further, the drive gear 53 has a protrusion 58 for rotation transmission that is inserted into the hole 56. The rotation of the sun gear 52 is transmitted to the drive gear 53 through engagement between the hole 56 and the protrusion 58. The hole 56 and the protrusion 58 constitute a transmission mechanism 59. The driven gear 54 is provided on the rotation axis AX3 which is parallel to the rotation axis AX1 and coaxial with the cylindrical protrusion 69. The driven gear 54 meshes with the drive gear 53 to circumscribe the drive gear 53. When the drive gear 53 rotates about the rotation axis AX1, the driven gear 54 rotates about the rotation axis AX3. At this time, the rotational speed of the driven gear 54 is reduced relative to the rotational speed of the drive gear 53.

The output shaft 40 has a cylindrical shape, and is provided coaxially with the rotation axis AX3. The partition 65 has a through support hole 66 coaxial with the rotation axis AX3. The output shaft 40 is rotatably supported about the rotation axis AX3 by a first flanged bush 46 fitted into the through support hole 66 and a second flanged bush 47 fitted inside the cylindrical protrusion 69. The driven gear 54 is a separate component from the output shaft 40, is fitted outwardly to the output shaft 40, and is connected to the output shaft 40 to transmit rotation. The manual shaft 26 is inserted into the output shaft 40, and is coupled to the output shaft 40 through, for example, spline fitting so as to transmit rotation.

One end 41 of the output shaft 40 is rotatably supported by the first flanged bush 46. The other end 42 of the output shaft 40 is rotatably supported by the second flanged bush 47. The driven gear 54 is supported in the axial direction by being clamped between a first flange portion 48 of the first flanged bush 46 and a second flange portion 49 of the second flanged bush 47. In another embodiment, the driven gear 54 may be supported in the axial direction by being clamped between a pair of supporting portions such as the case 60 and another plate.

The controller 16 includes a plurality of electronic components for controlling the motor 30, the control board 71 on which the electronic components are implemented, an output shaft position detection sensor 72 implemented on the control board 71, and a motor position detection sensor 73 implemented on the control board 71. The case 60 houses the controller 16. The control board 71 has a plurality of outer circumferential fixing portions fixed to the partition 65 by a heat caulking portion at an outer circumferential surface of the control board 71.

The output shaft position detection sensor 72 is disposed on the control board 71 at a position facing the magnet 43. The magnet 43 is fixed to a holder 44 attached to the output shaft 40. The output shaft position detection sensor 72 detects a rotational position of the output shaft 40 and the manual shaft 26 rotating together with the output shaft 40 by detecting a magnetic flux generated by the magnet 43.

The motor position detection sensor 73 is disposed on the control board 71 at a position facing the magnet 45. The magnet 45 is fixed to a holder 37 attached to the motor shaft 33. The motor position detection sensor 73 detects a rotational position of the motor shaft 33 and the rotor 32 by detecting a magnetic flux generated by the magnet 45.

(External Connecting Structure)

Next, a configuration of a connecting portion between the controller 16 and an external device (not shown) will be described. Hereinafter, a direction parallel to an extending direction of the control board 71 is referred to as a "board extending direction."

Figure 4:
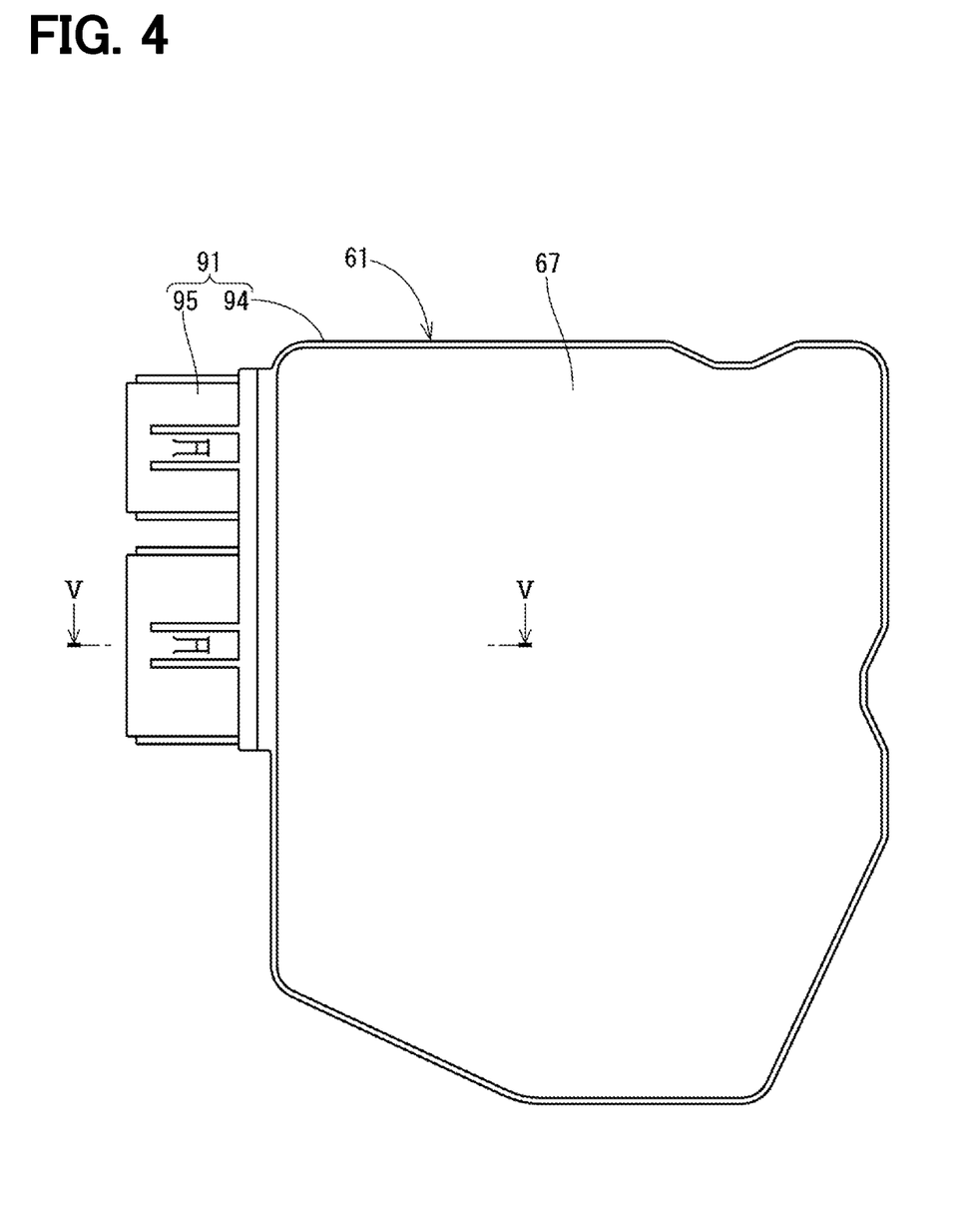
FIG. 4 is a view of the rotary actuator of FIG. 3 as viewed in IV direction.
Figure 5:
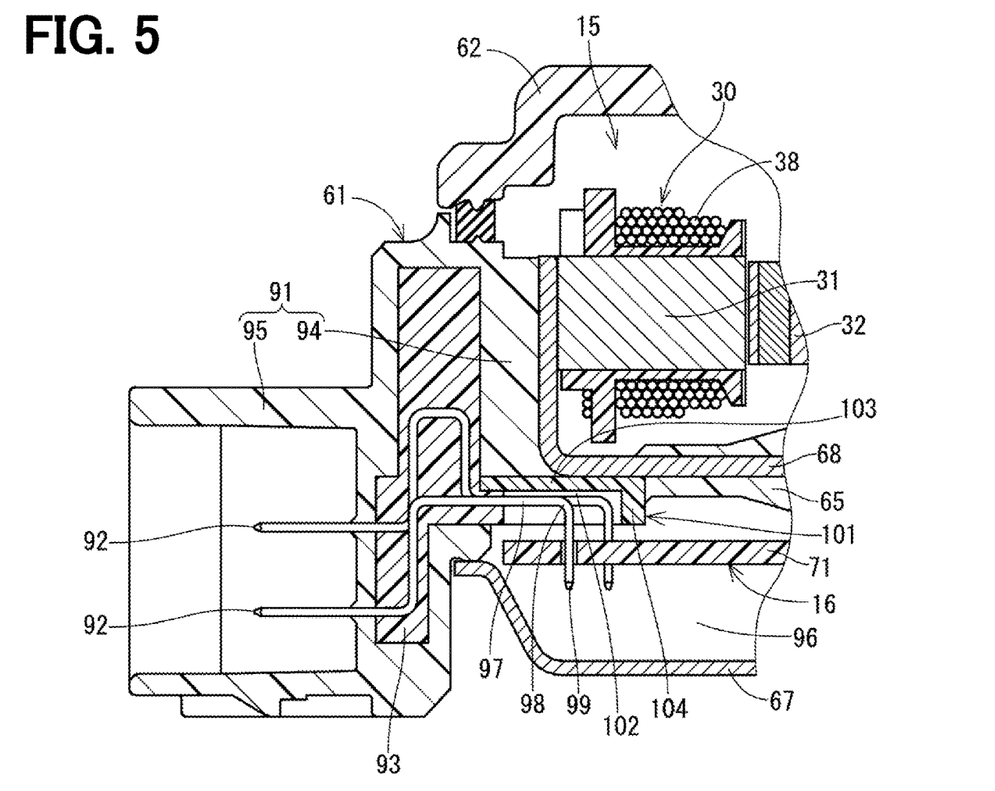
FIG. 5 is a sectional view of the rotary actuator of FIG. 4 taken along line V-V.

As shown in FIGS. 3 to 5, the upper case 61 includes a resin molded body 91, a plate case 68, a plurality of external connection terminals 92, and a primary molded body 93.

The resin molded body 91 is integrally provided with both a housing portion 94 that houses the motor 30 and a connector 95 for external connection. The housing portion 94 includes the one end 63, the other end 64, and the partition 65. When connecting the controller 16 to an external member, the connector 95 is detachably connected to an external connector (not shown) of the external member.

The external connection terminals 92 electrically connect the controller 16 to the external member. The external connection terminals 92 are connected to terminals of the external connector so that the controller 16 is electrically connected to the external member. The external connection terminals 92 are configured to allow for power supply and signal transmission between the controller 16 and the external member. The primary molded body 93 integrally holds the plurality of external connection terminals 92. The plurality of external connection terminals 92 are embedded in the resin molded body 91 together with the primary molded body 93 and the plate case 68 through insert molding. The resin molded body 91 is a secondary molded body.

Each of the external connection terminals 92 has a bend 98 configured to reduce a stress that is generated due to temperature deformation or vibration and is applied to the connecting portions between the control board 71 and the external connection terminals 92. Specifically, each of the external connection terminals 92 includes a base 97 protruding into the installation space 96 of the control board 71 in the board extending direction, the bend 98 bent from the base 97 toward the control board 71, and a tip portion 99 extending from the bend 98 to the control board 71.

Here, a comparative example in which the connector is provided as a separate component from the upper case will be discussed. In the comparative example, there is a concern that the connector strength is insufficient with respect to the load generated when attaching/detaching the connector or the weight of the wire harness during its vibration. In addition, it would be necessary to apply a sealant between the connector and the upper case both of which are separately formed with each other. Since the connector needs to be fit into the upper case and be clamped from both upper and lower sides, it may be difficult to apply a sealant and, as a result, sufficient sealing between the connector and the upper case cannot be obtained.

On the contrary, in the first embodiment, by integrally forming the connector 95 with the housing portion 94 through resin molding, it is easy to secure a connecting force by the connector 95 as compared with the above-described comparative example in which the connector is attached to the case 60 as a separate component. Further, since no gap is formed between the connector 95 and the housing portion 94, there is no need to apply sealing therebetween. Therefore, a sufficient connecting force by the connector 95 and sealing for the case 60 can be ensured.

To enable the stress releasing structure of each of the external connection terminals 92 to work, it is necessary to prevent the bend 98 from being buried in the resin even when the connector 95 is formed integrally with the housing portion 94 by resin molding. That is, when the resin molded body 91 is molded, the resin must be prevented from reaching the bend 98.

Figure 6:
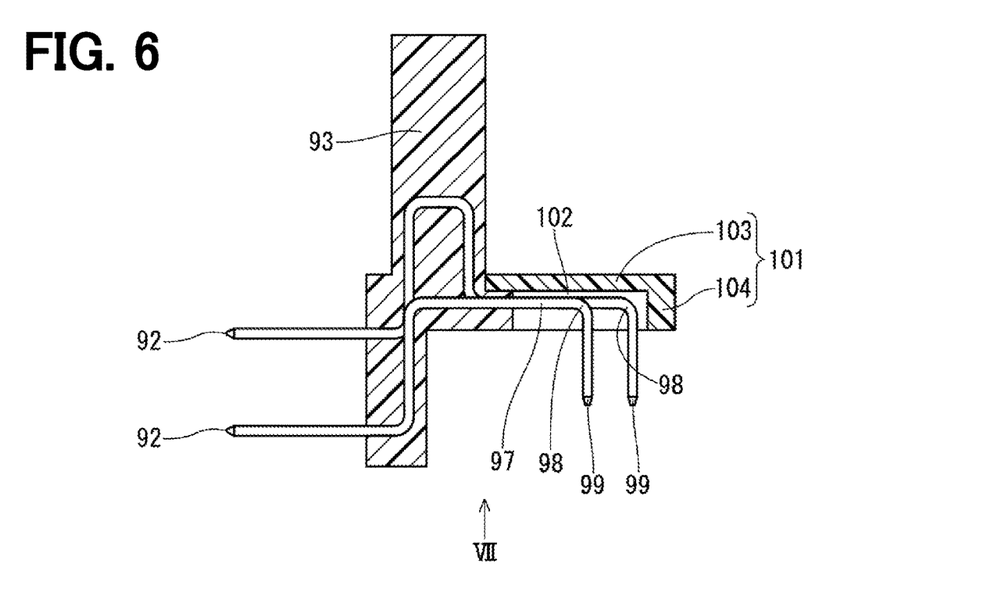
FIG. 6 is a view showing external connection terminals, a primary molded body, and a shielding member of FIG. 5.
Figure 7:
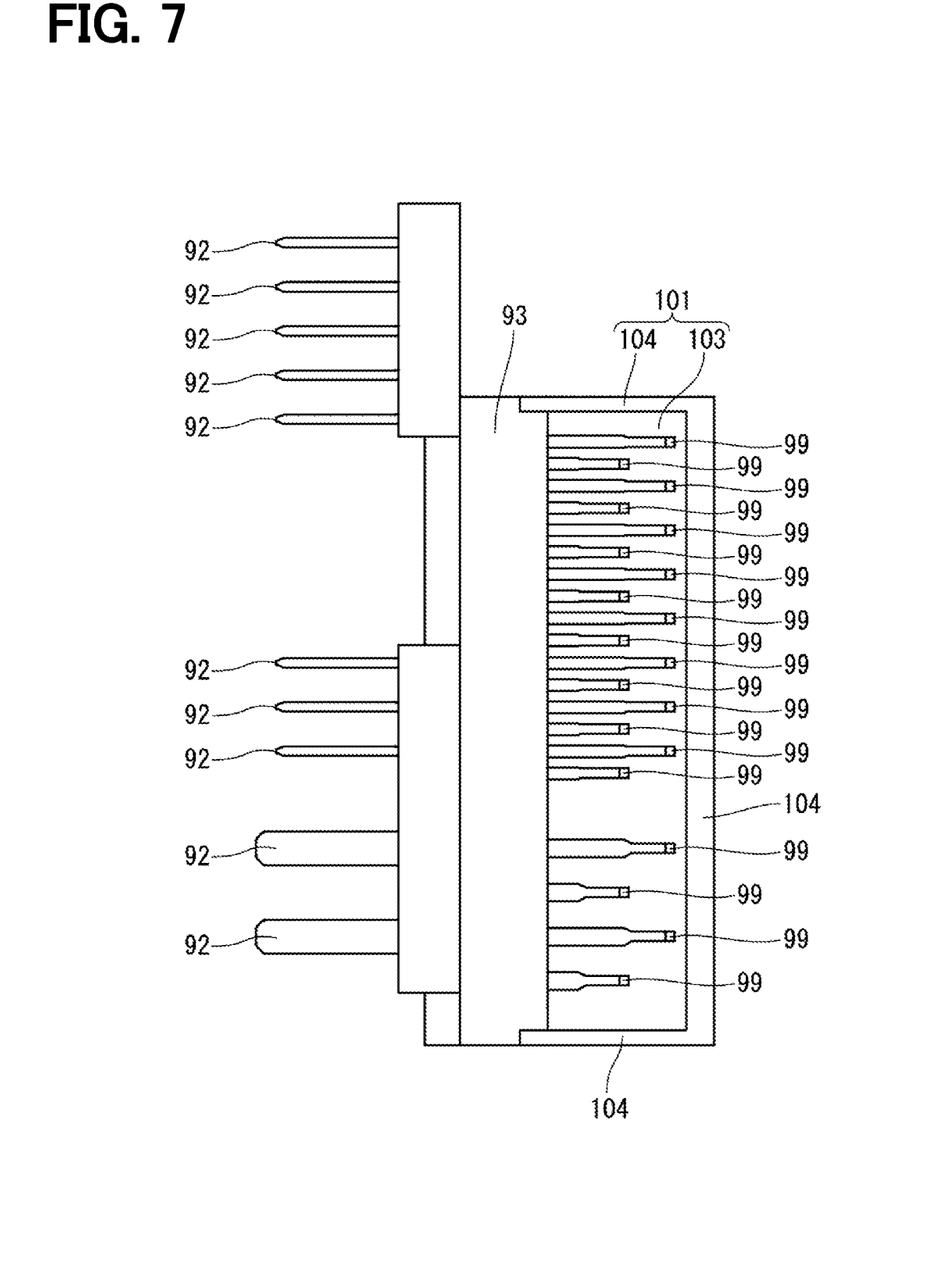
FIG. 7 is a view of the external connection terminals, the primary molded body, and the shielding member of FIG. 6 as viewed in direction VII.

In the first embodiment, as shown in FIGS. 5 to 7, the upper case 61 further includes a shielding member 101. The shielding member 101 is disposed between the resin molded body 91 and the base and bend 97 and 98 to form a stress releasing space 102 between the shielding member 101 and the base and bend 97, 98. The shielding member 101 includes a back wall 103 that is arranged on a side of the base 97 and the bend 98 opposite to the control board 71 and a circumferential wall 104 that is arranged to surround the base 97 and the bend 98.

The shielding member 101 is installed in a secondary molding die while being fitted to the primary molded body 93 when the resin molded body 91 is secondary-molded. Then, cutting the resin is performed so that a molten resin injected into the secondary molding die does not reach the bend 98. In the first embodiment, the circumferential wall 104 is provided to protrude toward the control board 71 than the partition 65 protrudes, and therefore cutting the resin can be reliably performed.

As described above, in the first embodiment, the upper case 61 includes the resin molded body 91, which integrally has the housing portion 94 that houses the motor 30 and the connector 95 that is used for external connection, and the plurality of external connection terminals 92, which are embedded in the resin molded body 91 and are capable of connecting the controller 16 to an external member. Each of the external connection terminals 92 includes the base 97 protruding into the installation space 96 of the control board 71 in the board extending direction, the bend 98 bent from the base 97 toward the control board 71, and the tip portion 99 extending from the bend 98 to the control board 71.

As described above, since the connector 95 is integrally formed with the housing portion 94 by resin molding, it is easier to secure the connecting strength as compared with a structure in which the connector is fitted into a separately formed case. Further, since no gap is formed between the connector 95 and the housing portion 94, there is no need to apply sealing therebetween. Therefore, the connector strength and sealing for the case can be ensured at the same time.

In addition, by providing the bend 98 in each of the external connection terminals 92, a stress that is generated due to temperature deformation or vibration and is applied to the connecting portion between the control board 71 and the external connection terminals 92 can be reduced, and therefore reliability can be improved.

Further, in the first embodiment, the upper case 61 includes the primary molded body 93 integrally having the plurality of external connection terminals 92 and the shielding member 101 that is disposed between the resin molded body 91 as a secondary molded body and the base and bend 97 and 98 to form the stress releasing space 102 between the shielding member 101 and the base and bend 97 and 98. By providing the shielding member 101 separately from the primary molded body 93 as described above, it is not necessary to hold the external connection terminals 92 by a mold, and the stress releasing space 102 can be formed after secondary-molding the resin molded body 91.

In the first embodiment, the shielding member 101 includes the back wall 103 that is disposed on a side of the base 97 and the bend 98 opposite to the control board 71 and the circumferential wall 104 that is disposed to surround the base 97 and the bend 98. Accordingly, when the resin molded body 91 is secondarily molded, the resin can be prevented from flowing around (i.e., reaching) the bend 98 by the circumferential wall 104 that is provided to the secondary molding die.

Second Embodiment

Figure 8:
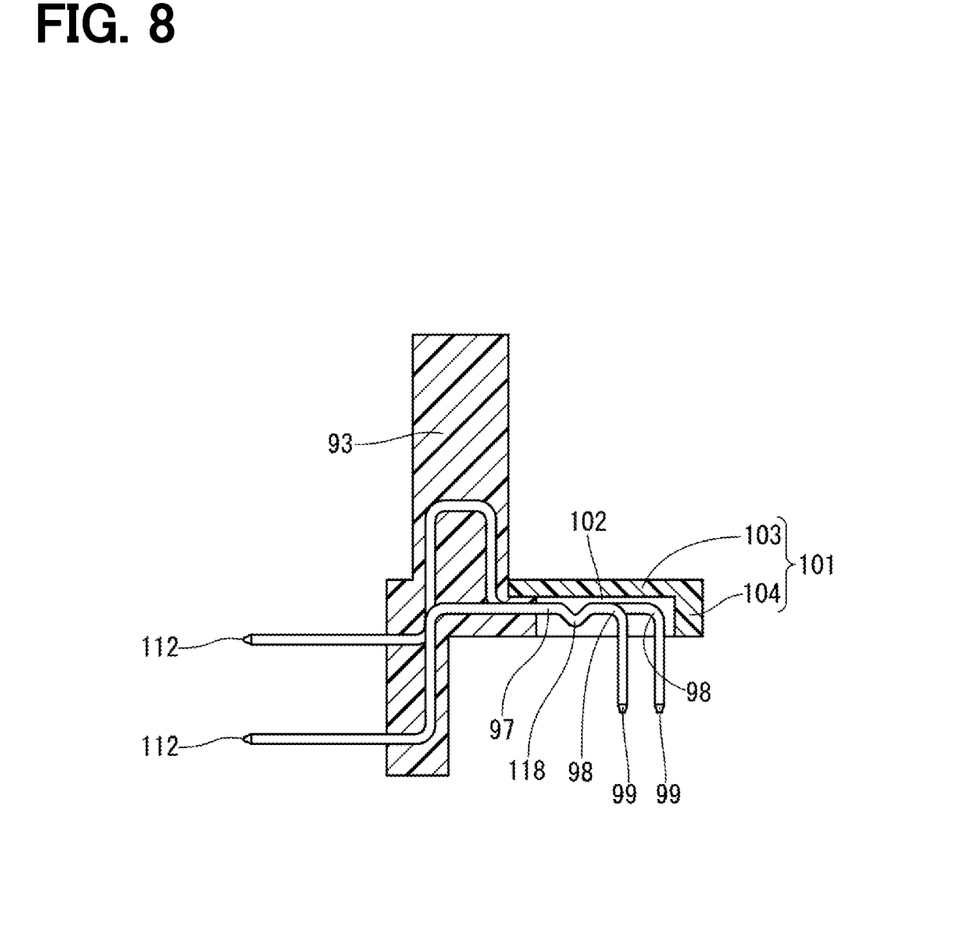
FIG. 8 is a sectional view showing external connection terminals, a primary molded body, and a shielding member of a rotary actuator according to a second embodiment, which is corresponding to FIG. 6 of the first embodiment.

In the second embodiment, as shown in FIG. 8, each of the external connection terminals 112 includes a second bend portion 118 provided in the base 97 in addition to the first bend portion 98 similar to the bend 98 as described in the first embodiment. With the second bend portion 118, the rigidity of the external connection terminal 112 can be further reduced with respect to the external connection terminals 92 of the first embodiment, and the structure is advantageous in terms of stress relaxation.

Other Embodiments

In another embodiment, the second bend may be provided at a tip portion of each of the external connection terminals. In yet another embodiment, the control board may be fixed not only by heat caulking but also by another fixing measure such as screw fastening, bonding, press-fitting, and press-fitting. Further, the control board is not necessarily limited to be fixed to the case, and may be fixed to a plate cover which is another part of the housing.

The present disclosure is not limited to the embodiments described above, and can be implemented in various forms without departing from the spirit of the invention.

The invention claimed is:

1. A rotary actuator for a shift-by-wire system of a vehicle, the rotary actuator comprising:
   a motor;
   a controller that controls the motor; and
   a case that houses the motor and the controller, wherein
   the case includes a resin molded body and a plurality of external connection terminals, the resin molded body integrally having a housing portion that houses the motor and a connector used for external connection with an external member, the plurality of external connection terminals being embedded in the resin molded body to connect the controller to the external member,
   a direction that is parallel to a board of the controller is defined as a board extending direction, and
   each of the plurality of external connection terminals includes:
   a base protruding into a space for installing the board in the board extending direction;
   a bend bent from the base toward the board; and
   a tip portion extending from the bend to the board, wherein the case further includes a primary molded body and a shielding member,
   the primary molded body integrally holds the plurality of the external connection terminals,
   the shielding member is separately disposed from the primary molded body between:
   the resin molded body as a secondary molded body; and
   the base and the bend,
   a stress releasing space is formed between the shielding member and the base and the bend, and
   the shielding member surrounds the base and the bend and is configured to prevent a molten resin from reaching the bend when the resin molded body is secondary-molded.

2. The rotary actuator according to claim 1, wherein
   the shielding member includes a back wall portion and a circumferential wall,
   the back wall portion is disposed on a side of the base and the bend opposite to the board, and
   the circumferential wall is disposed to surround the base and the bend.

3. The rotary actuator according to claim 1, wherein
   the bend is a first bend portion, and
   each of the plurality of external connection terminals further includes a second bend portion disposed at the base or the tip portion.

4. The rotary actuator according to claim 1, wherein
   the shielding member includes a back wall portion and a circumferential wall,
   the circumferential wall of the shielding member is configured to prevent the molten resin from reaching the bend when the resin molded body is secondary-molded.

5. The rotary actuator according to claim 1, wherein
   the shielding member includes a back wall portion and a circumferential wall,
   the back wall portion and the circumferential wall extend perpendicular to each other, and
   the circumferential wall and a part of the tip portion extending from the bend towards the board are spaced apart.

6. The rotary actuator according to claim 1, wherein the base extends perpendicularly to the tip portion.

7. The rotary actuator according to claim 1, wherein
   the shielding member includes a back wall portion and a circumferential wall,
   the base extends perpendicularly to the tip portion, and
   the tip portion extends parallel to a plane in which the circumferential wall is disposed.

\* \* \* \* \*